(12) United States Patent
Chen et al.

(10) Patent No.: US 8,479,642 B2
(45) Date of Patent: Jul. 9, 2013

(54) TEA POT WITH INTERNAL VALVE

(76) Inventors: Han Tsung Chen, Taichung (TW); Wei Fu Chen, Taichung (TW)

( * ) Notice: Subject to any disclaimer, the term of this patent is extended or adjusted under 35 U.S.C. 154(b) by 484 days.

(21) Appl. No.: 12/848,238

(22) Filed: Aug. 2, 2010

(65) Prior Publication Data
US 2012/0024161 A1     Feb. 2, 2012

(51) Int. Cl.
*A47J 31/06*        (2006.01)
(52) U.S. Cl.
USPC ............... 99/299; 99/304; 99/305; 99/306; 426/77; 426/79
(58) Field of Classification Search
USPC .............. 99/275, 295, 279, 297, 322, 323, 99/316–319, 495, 494, 484; 206/219, 222; 210/474–479, 181, 282; 220/23.8, 912, 712, 220/713, 718; 221/312 C; 225/54; 426/77, 426/110, 78, 86, 112, 134, 115, 120, 82–84, 426/6, 432, 433, 435
See application file for complete search history.

(56) References Cited

U.S. PATENT DOCUMENTS 5,832,809 A * 11/1998 Gras ................................. 99/299
6,481,337 B1 * 11/2002 Guu ................................. 99/285

* cited by examiner

*Primary Examiner* — Henry Yuen
*Assistant Examiner* — Thien S Tran

(57)     ABSTRACT

A tea pot includes a lower container assembly comprising an internally threaded open top, a releasable bottom, and a diaphragm for dividing space of the lower container assembly into a lower beverage chamber and an upper passage chamber, the diaphragm having holes for communicating the beverage chamber with the passage chamber and an annular flange projecting into the passage chamber; and an upper container assembly comprising an externally threaded lower portion secured to the top of the lower container assembly, a releasable top, a bottom dividing the upper container assembly into upper ingredient chamber and lower passageway chamber, a cylindrical channel integrally formed with the bottom of the upper container assembly and projecting into the passageway chamber, and an annular gasket put on the channel and blocking the holes when the upper and lower container assemblies are threadedly secured together; and a strainer in the ingredient chamber.

1 Claim, 7 Drawing Sheets

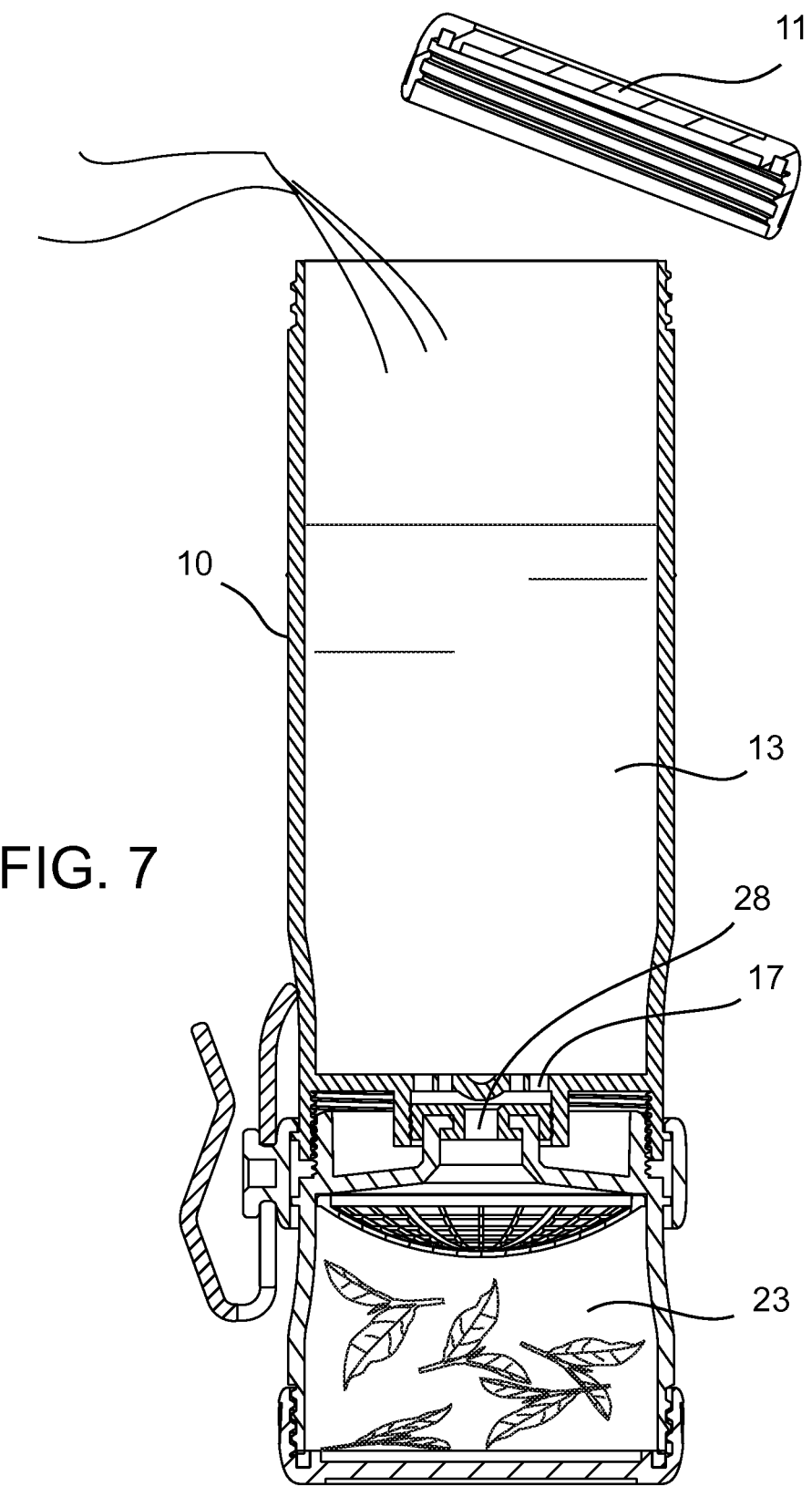

TEA POT WITH INTERNAL VALVE

BACKGROUND OF THE INVENTION

1. Field of Invention

The invention relates to vessels for steeping tea leaves in hot water and more particularly to a tea pot having an internal valve.

2. Description of Related Art

Typically, tea leaves are put into a vessel and then hot water is added or vice versa. After a few minutes, a fragrant tea is made. However, a person may often carelessly drink the extracted tea leaves. It is found that the less the hot water, the more the extracted tea leaves being drunk by a person. Moreover, the flavor of tea infusion is consumed quickly.

A typical tea steeping device comprises a cup comprising a cone shape inclined bottom, a through hole in the bottom center, a flange around the periphery of the cup bottom, a plurality of symmetric vertical holes formed on the surface of the flange, and a plurality of paired and symmetric foot plates being extended from the flange; a strainer in the cup bottom; a disk having a ring with a diameter slightly less than the flange, the ring having a plurality of symmetric posts so as to insert into the respective holes of the flange so that the cup and the disk are capable of lifting or lowering a rod in the ring center, and holes through the foot plates on the disk adjacent the ring; a water stopper comprising a stop pad at the hole on the cup bottom, and a metal ball on the hole, wherein the stop pad facing the top of the ball has a slot so as to be spaced from and formed with a thinner stop ring; wherein when the cup is placed on a flat surface, the disk slides downwards along the hole and the water stopper is released so that the water stopper will apply force against the hole to block exit.

However, the conventional tea steeping device suffers from disadvantages. For example, its components are complicated. Also, it is not durable. Moreover, its manufacturing cost is relatively high. Thus, the need for improvement still exists.

SUMMARY OF THE INVENTION

It is therefore one object of the invention to provide a tea pot comprising a lower container assembly comprising an internally threaded open top, a releasable bottom, and a diaphragm for dividing space of the lower container assembly into a lower beverage chamber and an upper passage chamber, the diaphragm having holes for communicating the beverage chamber with the passage chamber and an annular flange projecting into the passage chamber; and an upper container assembly comprising an externally threaded lower portion releasably secured to the top of the lower container assembly, a releasable top, a bottom diaphragm member for dividing space of the upper container assembly into an upper ingredient chamber and a lower passageway chamber, a cylindrical channel integrally formed with the diaphragm member of the upper container assembly and projecting into the passageway chamber, and an annular gasket releasably secured to the channel, the gasket being put on an outer surface of the channel and urging against the diaphragm to block the holes when the upper and lower container assemblies are threadedly secured together; and a strainer disposed on top of the diaphragm member in the ingredient chamber, wherein in response to opening the top of the upper container assembly, placing tea leaves on the strainer, pouring hot water into the ingredient chamber to steep, brewing the tea leaves for a predetermined period of time to make beverage, and loosening the upper container assembly to unblock the holes, the beverage flows from the ingredient chamber into the beverage chamber for accumulation via the channel, a central portion of the gasket, and the holes.

The above and other objects, features and advantages of the invention will become apparent from the following detailed description taken with the accompanying drawings.

BRIEF DESCRIPTION OF THE DRAWINGS

FIG. 7 is a view of the inverted tea pot showing the brewing of herbal tea or tea by cold water according to another configuration of the invention.

DETAILED DESCRIPTION OF THE INVENTION

Figure 1:
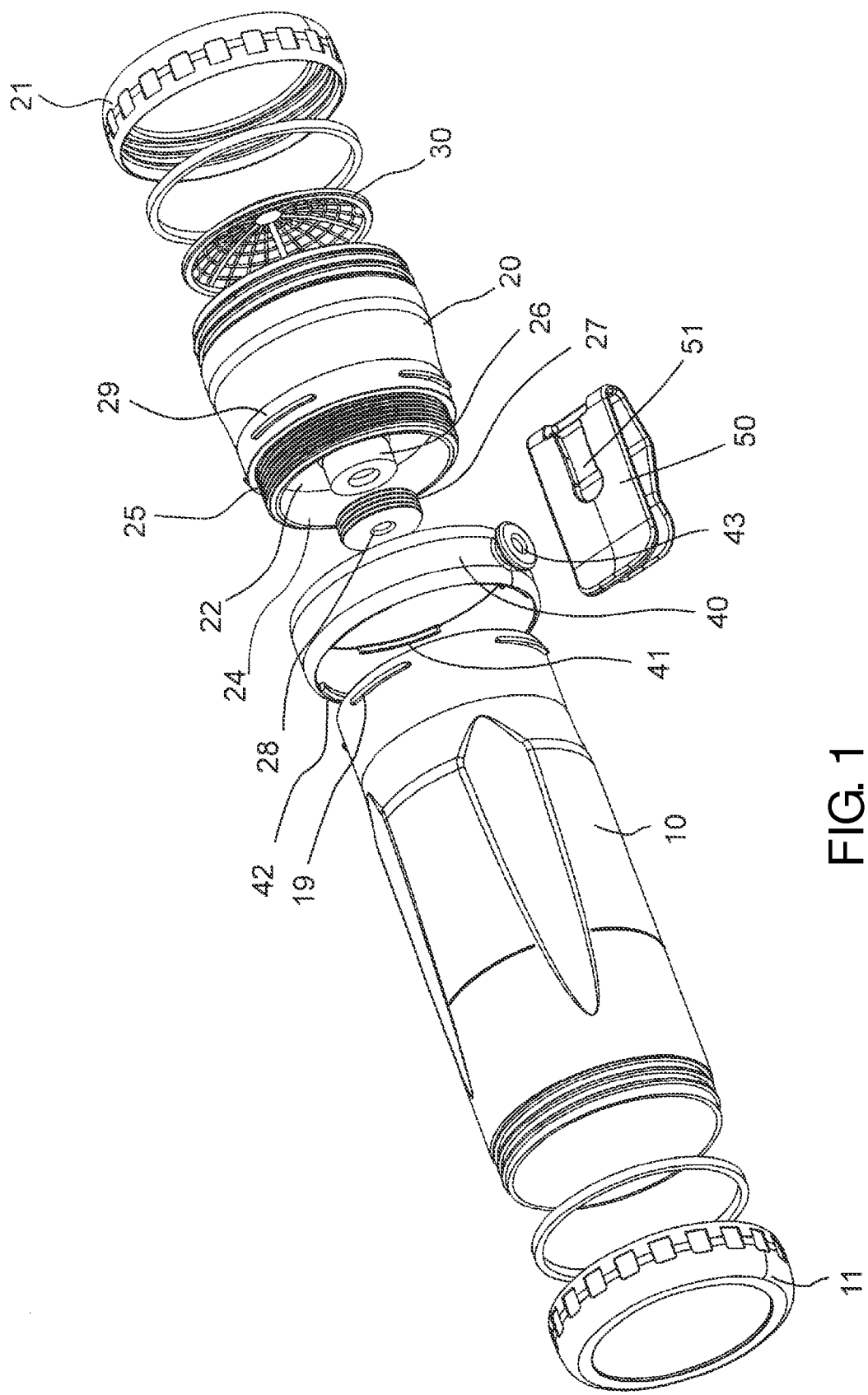
FIG. 1 is an exploded view of a tea pot according to a preferred embodiment of the invention.
Figure 2:
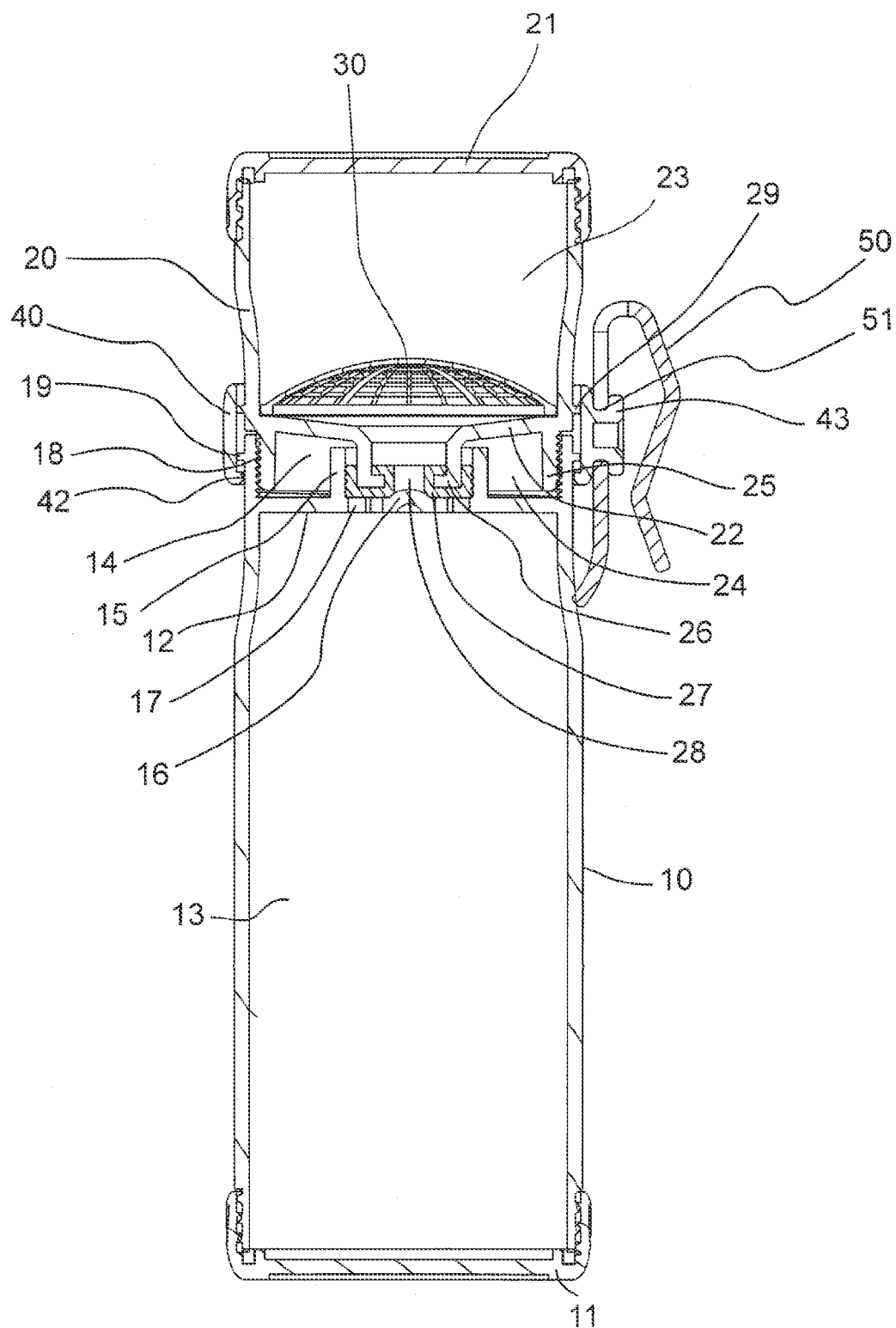
FIG. 2 is a longitudinal sectional view of the assembled tea pot.

Referring to FIGS. 1 to 6, a tea pot in accordance with a preferred embodiment of the invention comprises the following components as discussed in detail below.

A lower container assembly 10 comprises a threaded bottom cap 11, an upper diaphragm 12 for dividing the space of the lower container assembly 10 into a lower beverage chamber 13 and an upper passage chamber 14, an annular flange 15 integrally formed with the diaphragm 12 and projecting into the passage chamber 14, a perforated plate 16 on the centers of both the diaphragm 12 and the flange 15, the perforated plate 16 being integrally formed with the diaphragm 12 and having a convex center projecting toward the passage chamber 14, a plurality of holes 17 through the annular area between center of the perforated plate 16 and the flange 15 for communicating the beverage chamber 13 and the passage chamber 14, an internally threaded annular top 18, and a plurality of equally spaced elongated tabs 19 on the outer surface of the top 18.

An upper container assembly 20 comprises an externally threaded lower portion 25 threadedly secured to the top 18, a top cap 21 having internal threads threadedly secured to an externally threaded upper portion of the container assembly 20, a bottom diaphragm member 22 dividing the internal space of the container assembly 20 into an upper ingredient chamber 23 and a lower passageway chamber 24, the passageway chamber 24 being in the same place as the passage chamber 14 when the upper and lower container assemblies 20, 10 are assembled, a cylindrical channel 26 integrally formed with the diaphragm member 22 and projecting into the passageway chamber 24, an annular gasket 27 with the channel 26 releasably secured thereto, the gasket 27 put on the outer surface of the channel 26 and urging against the perforated plate 16 to block the holes 17 when the upper and lower container assemblies 20, 10 are assembled, a tunnel 28 through the center of the gasket 27, and a plurality of equally spaced elongated tabs 29 on the outer surface of the container assembly 20 adjacent the lower portion 25.

An umbrella top shaped strainer 30 is provided on top of the diaphragm member 22. A plastic retainer ring 40 comprises a plurality of spaced elongated tabs 41 on top of an inner surface, a plurality of spaced elongated tabs 42 on bottom of the inner surface, and an enlargement 43 having a concave outer surface. A plastic clip 50 comprises a slot 51 releasably secured to the concave outer surface of the enlargement 43. The top tabs 41 are offset with respect to the bottom tabs 42. The top tabs 41 are seated upon the tabs 29 and the tabs 19 are seated upon the bottom tabs 42 respectively when the retainer ring 40 is secured onto a joining portion of the container assemblies 10, 20. The provision of the retainer ring 40 can prevent the upper container assembly 20 from disengaging the lower container assembly 10 when loosening the upper container assembly 20. Moreover, the provision of the clip 50 in cooperation with the retainer ring 40 enables the tea pot to be hanged on the belt so that an individual may carry the tea pot in a convenient way.

Figure 3:
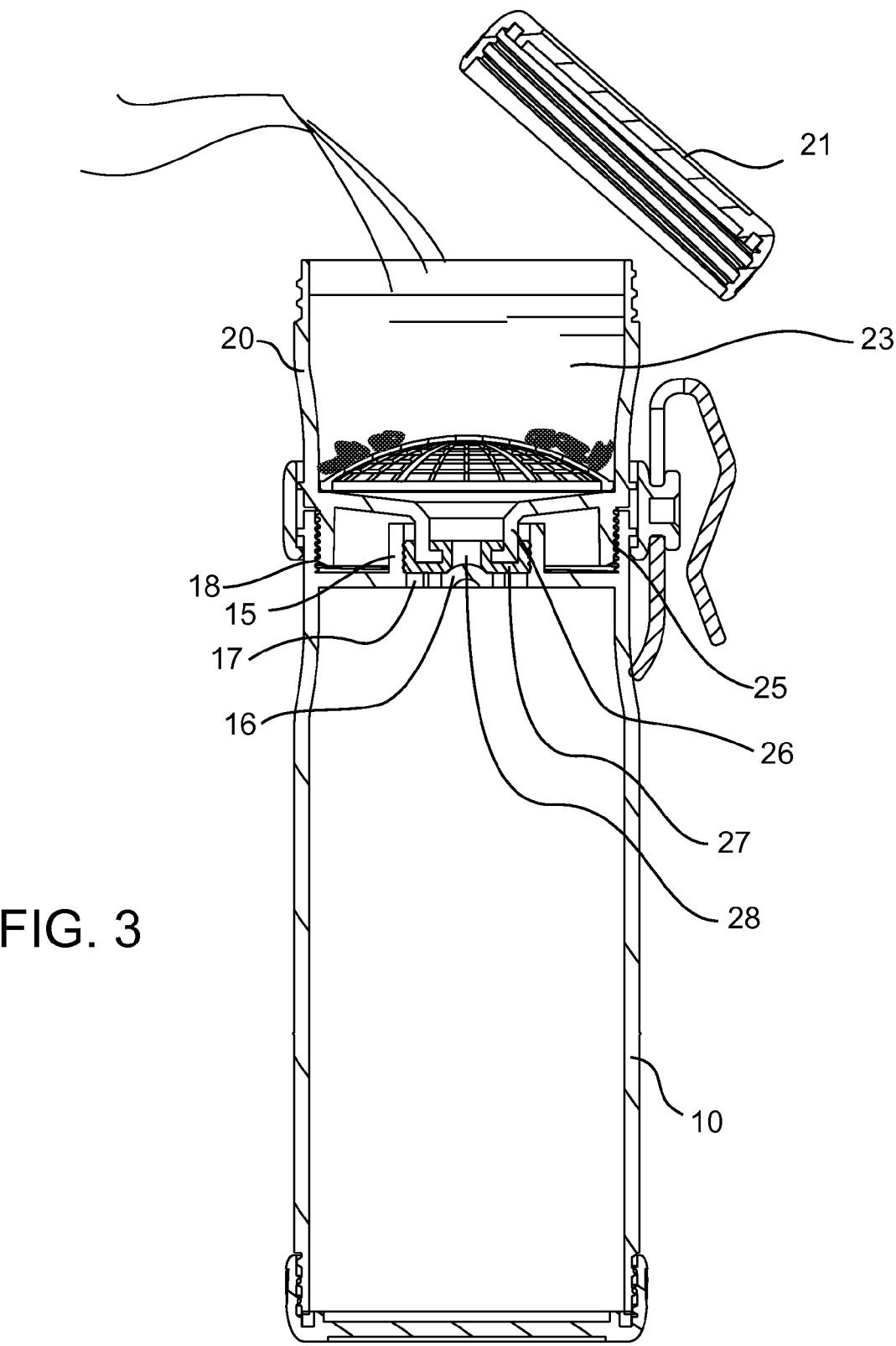
FIG. 3 is a view similar to FIG. 2 showing tea leaves have been placed upon the strainer and hot water being poured into the ingredient chamber after removing the cap.
Figure 4:
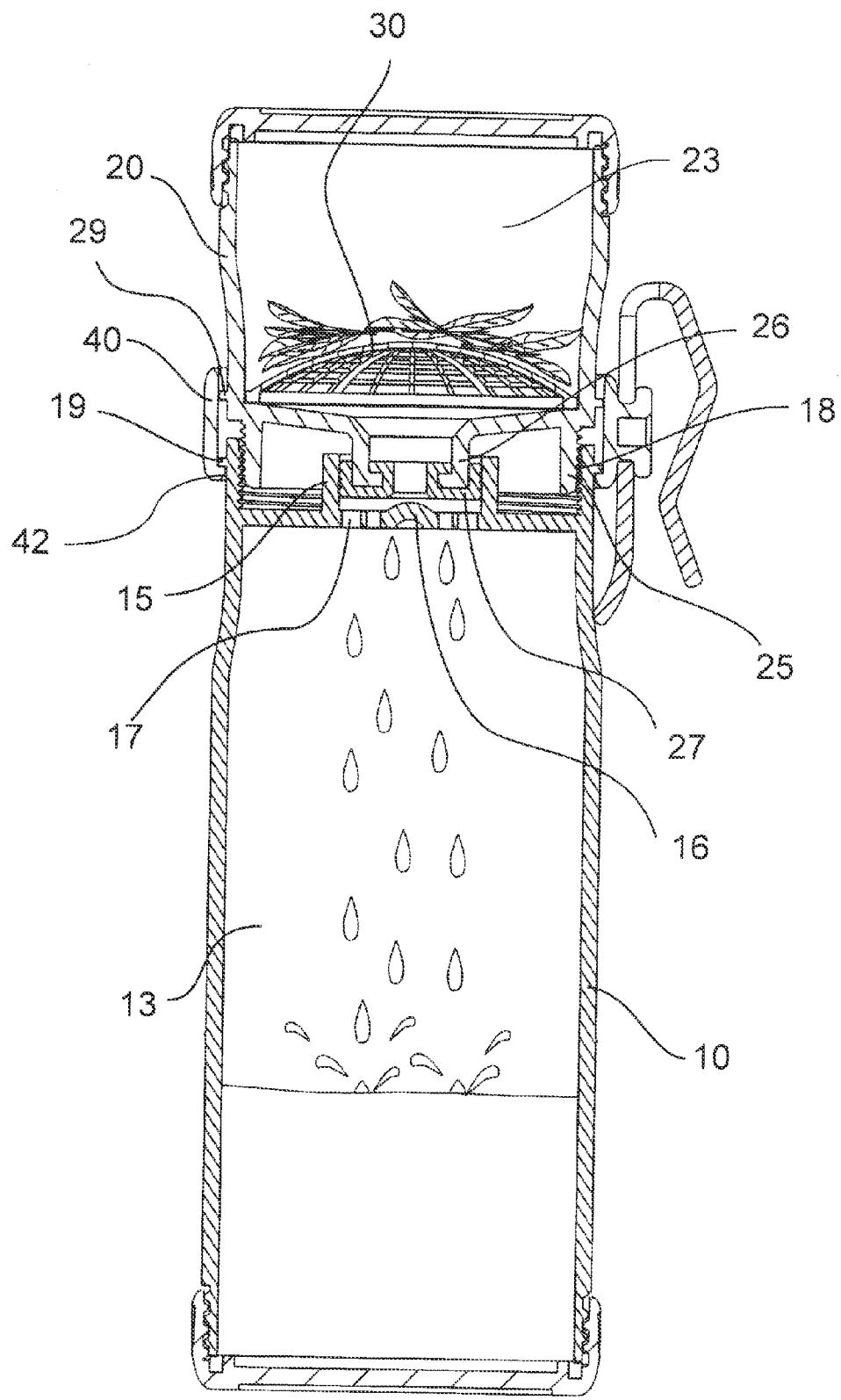
FIG. 4 is a view similar to FIG. 2 showing beverage made by brewing flowing into the lower container from the ingredient chamber and the cap secured to the top again.
Figure 5:
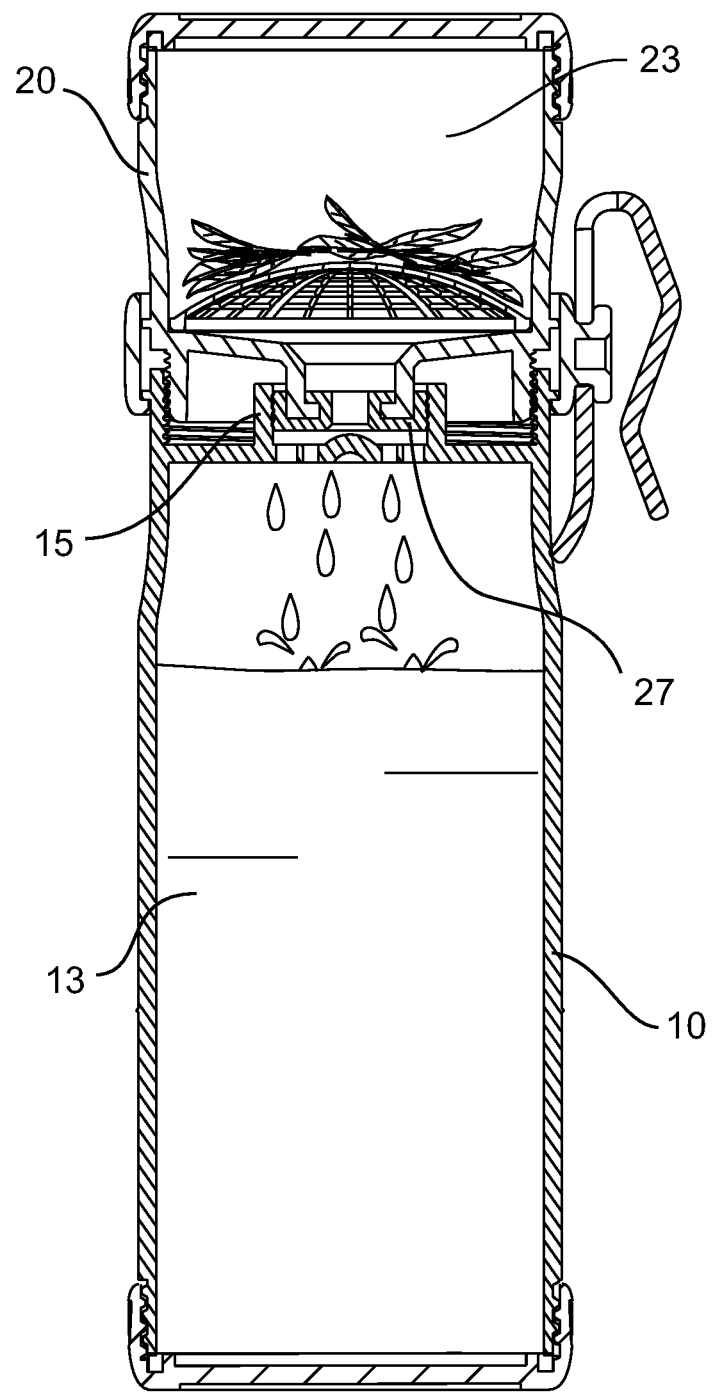
FIG. 5 is a view similar to FIG. 4 showing beverage rising much higher than that in FIG. 4 after a number of times of brewing.

The steeping operation of the tea pot is described in detailed below. As shown in FIG. 3, after removing the top cap 21, an individual may place tea leaves on the strainer 30 and pour hot water into the ingredient chamber 23 to steep. After a preset time (e.g., five to seven minutes) with beverage brewed in the ingredient chamber 23, the individual may loosen the upper container assembly 20 by counterclockwise turning a number of turns (see FIG. 4). The holes 17 are thus unblocked due to the upward movement of the gasket 27. Thus, the beverage flows from the ingredient chamber 23 into the beverage chamber 13 for accumulation via the channel 26, the tunnel 28, and the holes 17. The individual may, after removing the sufficiently extracted tea leaves, repeat steps described in FIGS. 3 and 4 a number of times until a desired quantity of tea is accumulated in the beverage chamber 13 (see FIG. 5).

Figure 6:
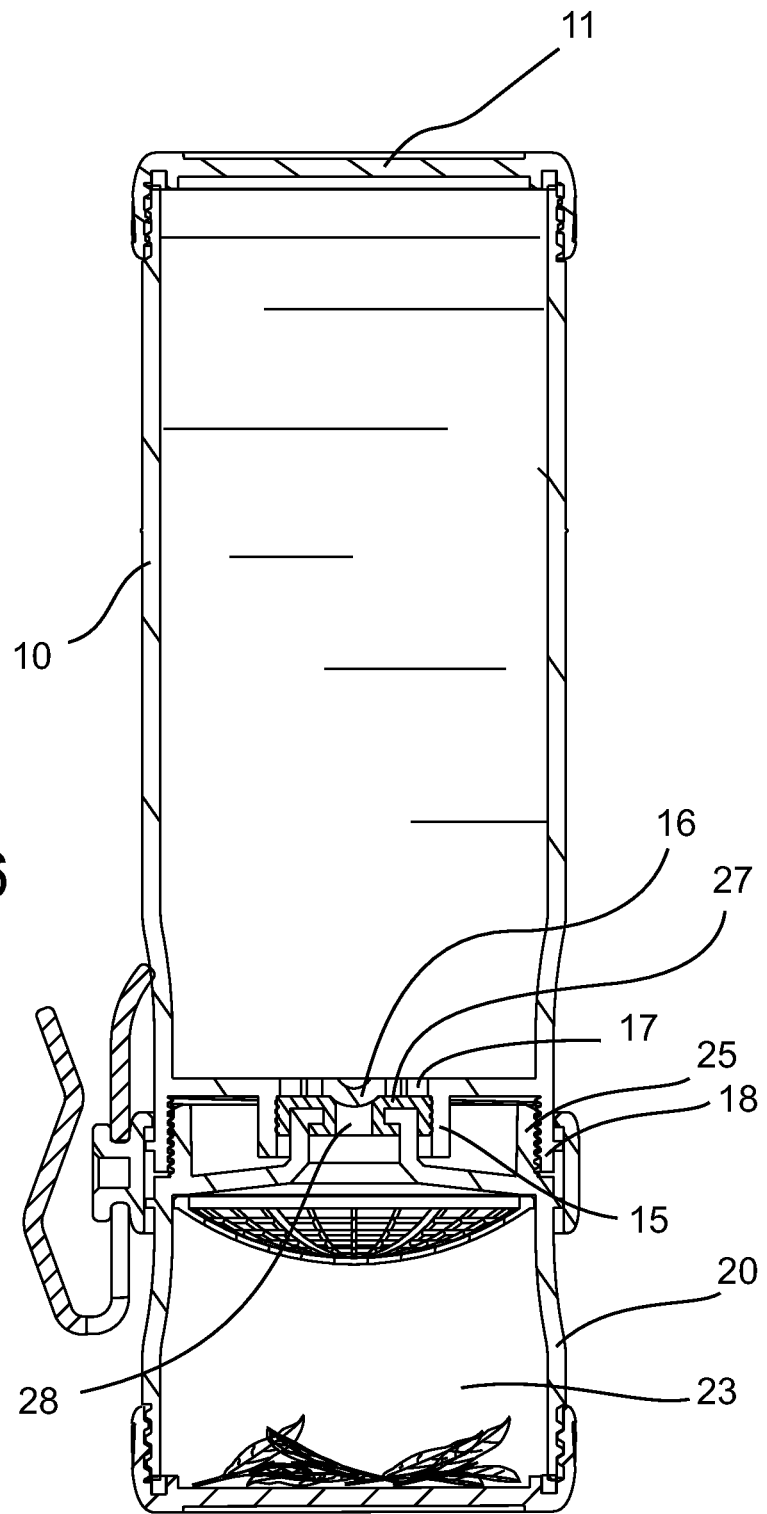
FIG. 6 is a view of the inverted tea pot full of beverage to be ready to serve.

As shown in FIG. 6, thereafter the individual may fasten the lower and upper container assemblies 10, 20. Thus, the holes 17 are blocked again. Next, turn the tea pot upside down to drop the fully extracted tea leaves onto the underside of the top cap 21. It is understood that tea in the beverage chamber 13 is prohibited from returning to the ingredient chamber 23 since the holes 17 are blocked. Next, remove the bottom cap 11. Finally, pour the tea out of the beverage chamber 13 for serving.

Referring to FIG. 7 in cooperation with FIGS. 1 to 6, another configuration of the invention is shown. This configuration is for brewing herbal tea or tea by cold water. For example, the steeping steps comprise opening the top cap 21, placing herbal tea on the strainer 30, fastening the top cap 21 again, loosening the upper container assembly 20 to unblock the holes 17, turning the tea pot upside down, opening the bottom cap 11, and pouring cold water into the beverage chamber 13. As a result, the cold water flows into the ingredient chamber 23 to steep the herbal tea via the holes 17 and the tunnel 28.

While the invention has been described in terms of preferred embodiments, those skilled in the art will recognize that the invention can be practiced with modifications within the spirit and scope of the appended claims.

What is claimed is:

1. A tea pot comprising:

a lower container assembly comprising an internally threaded open top, a releasable bottom, a diaphragm element for dividing space of the lower container assembly into a lower beverage chamber and an upper passage chamber, the diaphragm element having a plurality of holes for communicating the beverage chamber with the passage chamber and an annular flange projecting into the passage chamber, and a plurality of spaced first tabs on an outer surface of the top thereof;

an upper container assembly comprising an externally threaded lower portion releasably secured to the top of the lower container assembly, a releasable top, a bottom diaphragm member for dividing space of the upper container assembly into an upper ingredient chamber and a lower passageway chamber, a cylindrical channel integrally formed with the diaphragm member of the upper container assembly and projecting into the passageway chamber, a plurality of spaced second tabs on an outer surface adjacent the lower portion thereof, and an annular gasket releasably secured to the channel, the gasket being put on an outer surface of the channel and urging against the diaphragm element to block the holes when the upper and lower container assemblies are threadedly secured together;

a strainer disposed on top of the diaphragm member in the ingredient chamber; and a retainer ring comprising a plurality of spaced third tabs on an upper portion of an inner surface and a plurality of spaced fourth tabs on a lower portion of the inner surface, wherein the third tabs are offset with respect to the fourth tabs, and wherein the third top tabs are seated upon the second tabs and the first tabs are seated upon the fourth tabs respectively when the retainer ring is mounted onto a joining portion of the upper and lower container assemblies;

wherein in response to opening the top of the upper container assembly, placing tea leaves on the strainer, pouring hot water into the ingredient chamber to steep, brewing the tea leaves for a predetermined period of time to make beverage, and loosening the upper container assembly to unblock the holes, the beverage flows from the ingredient chamber into the beverage chamber for accumulation via the channel, a central portion of the gasket, and the holes.

\* \* \* \* \*